(12) United States Patent (10) Patent No.: US 8,438,654 B1
von Eicken et al. (45) Date of Patent: May 7, 2013

(54) SYSTEMS AND METHODS FOR ASSOCIATING A VIRTUAL MACHINE WITH AN ACCESS CONTROL RIGHT

(75) Inventors: Thorsten von Eicken, Santa Barbara, CA (US); Jose Maria Blanquer Gonzalez, Santa Barbara, CA (US); Raphael George Jacques Simon, Santa Barbara, CA (US)

(73) Assignee: RightScale, Inc., Santa Barbara, CA (US)

( * ) Notice: Subject to any disclaimer, the term of this patent is extended or adjusted under 35 U.S.C. 154(b) by 0 days.

(21) Appl. No.: 13/618,399

(22) Filed: Sep. 14, 2012

(51) Int. Cl.
*H04L 29/06* (2006.01)
*G06F 21/00* (2006.01)
*G06F 9/455* (2006.01)
*G06F 9/445* (2006.01)

(52) U.S. Cl.
USPC ............... 726/27; 726/4; 726/10; 709/217; 718/1

(58) Field of Classification Search .................. None
See application file for complete search history.

(56) References Cited

U.S. PATENT DOCUMENTS

| | | | |
|---|---|---|---|
| 7,058,807 B2 | 6/2006 | Grawrock et al. | |
| 7,305,549 B2 | 12/2007 | Hunt et al. | |
| 7,987,289 B2 | 7/2011 | Mason et al. | |
| 8,352,941 B1* | 1/2013 | Protopopov et al. | 718/1 |
| 2007/0039039 A1 | 2/2007 | Gilbert et al. | |
| 2009/0031396 A1 | 1/2009 | Jung et al. | |
| 2009/0276774 A1 | 11/2009 | Kinoshita | |
| 2009/0293058 A1 | 11/2009 | Ahn et al. | |
| 2010/0122333 A1* | 5/2010 | Noe | 726/8 |
| 2010/0131948 A1* | 5/2010 | Ferris | 718/1 |
| 2010/0132016 A1 | 5/2010 | Ferris | |
| 2011/0022812 A1 | 1/2011 | Van Der Linden et al. | |
| 2011/0061050 A1 | 3/2011 | Sahita et al. | |

(Continued)

FOREIGN PATENT DOCUMENTS

| | | |
|---|---|---|
| CN | 101980233 A | 2/2011 |
| WO | WO-2011/124873 A1 | 10/2011 |
| WO | WO-2012/024508 A2 | 2/2012 |
| WO | WO-2012/054016 A1 | 4/2012 |

OTHER PUBLICATIONS

"Advanced Cloud—Cloud Instance Open Authentication (OAuth) Security Mechanism," IP.com, Apr. 8, 2011; IP.com No. IPCOM000205927D.
"Multi-Tenancy Isolation in Datacenter Networks," IP.com, Oct. 25, 2011; IP.com No. IPCOM000212015D.
Ashford, Warwick. "Google Improves Security of Cloud Services." Computer Weekly. Mar. 23, 2012. <http://www.computerweekly.com/news/2240147377/Google-improves-security-of-cloud-services>.

(Continued)

*Primary Examiner* — Christopher Revak
(74) *Attorney, Agent, or Firm* — Foley & Lardner LLP; John D. Lanza

(57) ABSTRACT

The present invention is related to associating a machine or virtual machine instance with an access control right in a cloud-based computing environment. In one aspect, the present invention relates to an apparatus for or a method of associating a machine or virtual machine instance with an access control right in a cloud-based computing environment. In various embodiments, the apparatus is capable of, and the method includes, the following: receiving, in a cloud-based computing environment, a request to perform an action; using an identifier for the machine or virtual machine instance to determine that the received request was sent by, or on behalf of, the machine or virtual machine instance; and identifying an access control right associated with the machine or virtual machine instance making the request, to determine whether to perform the action on behalf of, or grant access by, the machine or virtual machine instance.

20 Claims, 6 Drawing Sheets

U.S. PATENT DOCUMENTS

| | | | |
|---|---|---|---|
| 2011/0126197 A1 | 5/2011 | Larsen et al. | |
| 2011/0142053 A1* | 6/2011 | Van Der Merwe et al. | 370/395.1 |
| 2011/0191485 A1 | 8/2011 | Umbehocker | |
| 2011/0197065 A1 | 8/2011 | Stauth et al. | |
| 2011/0209064 A1* | 8/2011 | Jorgensen et al. | 715/733 |
| 2011/0213691 A1* | 9/2011 | Ferris et al. | 705/37 |
| 2011/0214176 A1 | 9/2011 | Burch et al. | |
| 2011/0231670 A1 | 9/2011 | Shevchenko et al. | |
| 2011/0235085 A1 | 9/2011 | Jazayeri et al. | |
| 2011/0295970 A1* | 12/2011 | Miyazawa | 709/217 |
| 2012/0042163 A1 | 2/2012 | Goodman et al. | |
| 2012/0054486 A1 | 3/2012 | Lakkavalli et al. | |
| 2012/0110328 A1 | 5/2012 | Pate et al. | |
| 2012/0265976 A1* | 10/2012 | Spiers et al. | 713/2 |
| 2012/0266231 A1* | 10/2012 | Spiers et al. | 726/12 |
| 2012/0304233 A1* | 11/2012 | Roberts et al. | 725/82 |
| 2012/0311157 A1* | 12/2012 | Erickson et al. | 709/226 |
| 2012/0311571 A1* | 12/2012 | Morgan | 718/1 |
| 2013/0042115 A1* | 2/2013 | Sweet et al. | 713/176 |
| 2013/0067564 A1* | 3/2013 | Fok Ah Chuen et al. | 726/17 |

OTHER PUBLICATIONS

Ben Othmane, Lotfi, "Active bundles for protecting confidentiality of sensitive data throughout their lifecycle," Western Michigan University, 2010, ISBN: 9781124438696.

Berger, S.; Caceres, R.; Goldman, K.; Pendarakis, D.; Perez, R.; Rao, J. R.; Rom, E.; Sailer, R.; Schildhauer, W.; Srinivasan, D.; Tal, S.; Valdez, E.; , "Security for the cloud infrastructure: Trusted virtual data center implementation," IBM Journal of Research and Development, vol. 53, No. 4, pp. 6:1-6:12, Jul. 2009 doi: 10.1147/JRD.2009.5429060 URL: http://ieeexplore.ieee.org/stamp/stamp.jsp?tp=&arnumber=5429060&isnumber=5429054.

Namiluko, Cornelius, Jun Ho Huh, and Andrew Martin. "Verifying Trustworthiness of Virtual Appliances in Collaborative Environments." Trust and trustworthy computing 4th international conference, Trust 2011, Pittsburgh, PA, USA, Jun. 22-24, 2011 : proceedings. Berlin: Springer, 2011. 1-15.

* cited by examiner

SYSTEMS AND METHODS FOR ASSOCIATING A VIRTUAL MACHINE WITH AN ACCESS CONTROL RIGHT

FIELD OF THE INVENTION

Embodiments of the present invention relate generally to the field of cloud computing.

BACKGROUND OF THE INVENTION

Cloud infrastructure services allow users to use networked servers or to instantiate virtual servers running software specified by the users without requiring a customer to own or manage the physical hardware, e.g., the hardware underlying virtual server instances. Cloud infrastructure services, including, for example, Amazon EC2, may enable users to instantiate a number of virtual servers of a variety of different configurations to match their needs.

After being instantiated, a script on a virtual server may attempt to perform changes to the cloud configuration, or to other servers. For example, to create a backup of files, a command to take a snapshot of the disk volume may be issued by a virtual server to an application program interface (API) for the cloud provider. The cloud provider may be a vendor selling access to servers in a cloud configuration. A subscriber may have credentials for an account used to manage resources with the cloud infrastructure service. For example, subscribers to Amazon's AWS each have an account, in Google's Compute Engine it is called a project, and in Microsoft's Windows Azure it is called a subscription. Credentials may belong to a particular user and the user may have access to multiple accounts. To perform the snapshot action, the vendor's API may require that the caller have certain credentials. If the credentials are account-wide, users may place the account credentials on all servers that need to make such API calls. This could be a security risk because the account credentials give access to everything in the account. That is, an intruder that gains access to one such machine has access to everything.

For instance, an intruder who gains access to front-end load balancing servers that are typically exposed to the public may gain access to credentials that then allow him to retrieve backup disk snapshots of back-end database servers that are otherwise well-protected. In some circumstances, this could allow the intruder to access backups, unmount storage devices from databases and mount them on the compromised load balancers, launch additional databases from which data could be mined, modify the network security policies that prevent him from directly accessing back-end servers, etc. In another example, an intruder may register a non-existent server as a load-balancing server, using account credentials.

BRIEF SUMMARY OF THE INVENTION

The present invention is related to associating a machine or virtual machine instance with an access control right in a cloud-based computing environment.

In one aspect, the present invention relates to a method of associating a machine or virtual machine instance with an access control right in a cloud-based computing environment. In various embodiments, the method includes: receiving, in a cloud-based computing environment, a request to perform an action or to be granted access; using an identifier to determine that the received request was sent by, or on behalf of, the machine or virtual machine instance; and identifying an access control right associated with the machine or virtual machine instance making the request, to determine whether or not to perform the action on behalf of, or grant access by, the machine or virtual machine instance.

According to some embodiments, the method further includes determining a scope associated with the machine or virtual machine instance based on the access control right; and performing the request using the determined scope. In some further embodiments, performing the request using the determined scope includes one of: allowing the request, denying the request, partially allowing the request and partially denying the request, and modifying the request.

In some embodiments, the method further includes assigning the identifier to the machine or virtual machine instance.

In some embodiments, the method further includes sending the identifier to the machine or virtual machine instance.

According to some embodiments, the method further includes sending the identifier in a launch request to launch the virtual machine instance.

In some embodiments, the method further includes launching the virtual machine instance.

According to some embodiments, where the request is an authentication request, the method further includes returning a ticket in response to the authentication request.

In some embodiments, the method further includes receiving an indication of at least one access control right that is granted to the machine or virtual machine instance.

According to another aspect, the present invention relates to an apparatus for associating a machine or virtual machine instance with an access control right in a cloud-based computing environment. In various embodiments, the apparatus includes: a cloud management service in a cloud-based computing environment executing on a processor, the cloud management service receiving a request to perform an action or to be granted access; and a processor executing instructions to use an identifier for the machine or virtual machine instance to determine that the received request was sent by, or on behalf of, the machine or virtual machine instance and to identify an access control right associated with the machine or virtual machine instance making the request, to determine whether or not to perform the action on behalf of, or grant access by, the machine or virtual machine instance.

In some further embodiments of the apparatus, the processor executes further instructions to determine a scope associated with the machine or virtual machine instance based on the access control right; and perform the request using the determined scope. In still further embodiments, performing the request using the determined scope includes one of: allowing the request, denying the request, partially allowing the request and partially denying the request, and modifying the request.

According to some embodiments of the apparatus, the cloud management service assigns the identifier to the machine or virtual machine instance. In some embodiments, the cloud management service sends the identifier to the machine or virtual machine instance. In some embodiments, the cloud management service sends the identifier in a launch request to launch the virtual machine instance. According to some embodiments, the cloud management service launches the virtual machine instance. In some embodiments, the cloud management service returns a ticket in response to the request. In some embodiments, the cloud management service receives an indication of at least one access control right that is granted to the machine or virtual machine instance.

In some embodiments of the various aspects, the identifier is included in or associated with the received launch request. According to some embodiments, the identifier is unique to the machine or virtual machine instance. In some embodiments, the identifier is associated with a group of one or machines and/or one or more virtual machine instances of which the virtual machine instance is a member.

In some embodiments of the various aspects, identifying the access control right comprises evaluating whether the machine or virtual machine instance is allowed to perform the action or to be granted access.

According to some embodiments of the various aspects, the machine or virtual machine instance does not grant requests from other machines or virtual machine instances.

According to yet another aspect, the present invention relates to a method for associating a machine or virtual machine instance with an access control right in a cloud-based computing environment. In various embodiments, the method includes: receiving, in a cloud-based computing environment, a first request for a first machine or virtual machine instance to perform an action or to be granted access; using a first identifier to determine that the received first request was sent by, or on behalf of, the first machine or virtual machine instance; identifying a first access control right associated with the first machine or virtual machine instance making the first request, to determine whether or not to perform the first request; receiving, in a cloud-based computing environment, a second request for a second machine or virtual machine instance to perform an action or to be granted access; using a second identifier to determine that the received second request was sent by, or on behalf of, the second machine or virtual machine instance, wherein the second identifier is different from the first identifier; and identifying a second access control right associated with the second machine or virtual machine instance making the second request, to determine whether or not to perform the second request.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION OF THE INVENTION

Various embodiments of the present invention provide a method or apparatus for associating a machine or virtual machine with an access control right in a cloud-based computing environment. That is, credentials may be associated with machine(s) or virtual machine instance(s) (either of which may be referred to herein as "server(s)"). An access control list (ACL) may indicate specific access control rights for specific servers or server groups. This may allow specific servers to perform actions on other resources of the system.

For example, an ACL may be created that allows access on a per-machine or per-virtual-machine basis. Thus, if an intruder gains access to one server, the intruder will not have access to everything in the related account. Instead, the intruder may have access to only what that one server is restricted to. This provides the benefit of a reduced security risk. An ACL may allow specific servers (or groups of servers) to perform, or prevent specific servers (or groups of servers) from performing, specific actions on resources of a system. The methods and apparatuses related to various embodiments are discussed in further detail below.

Figure 1A:
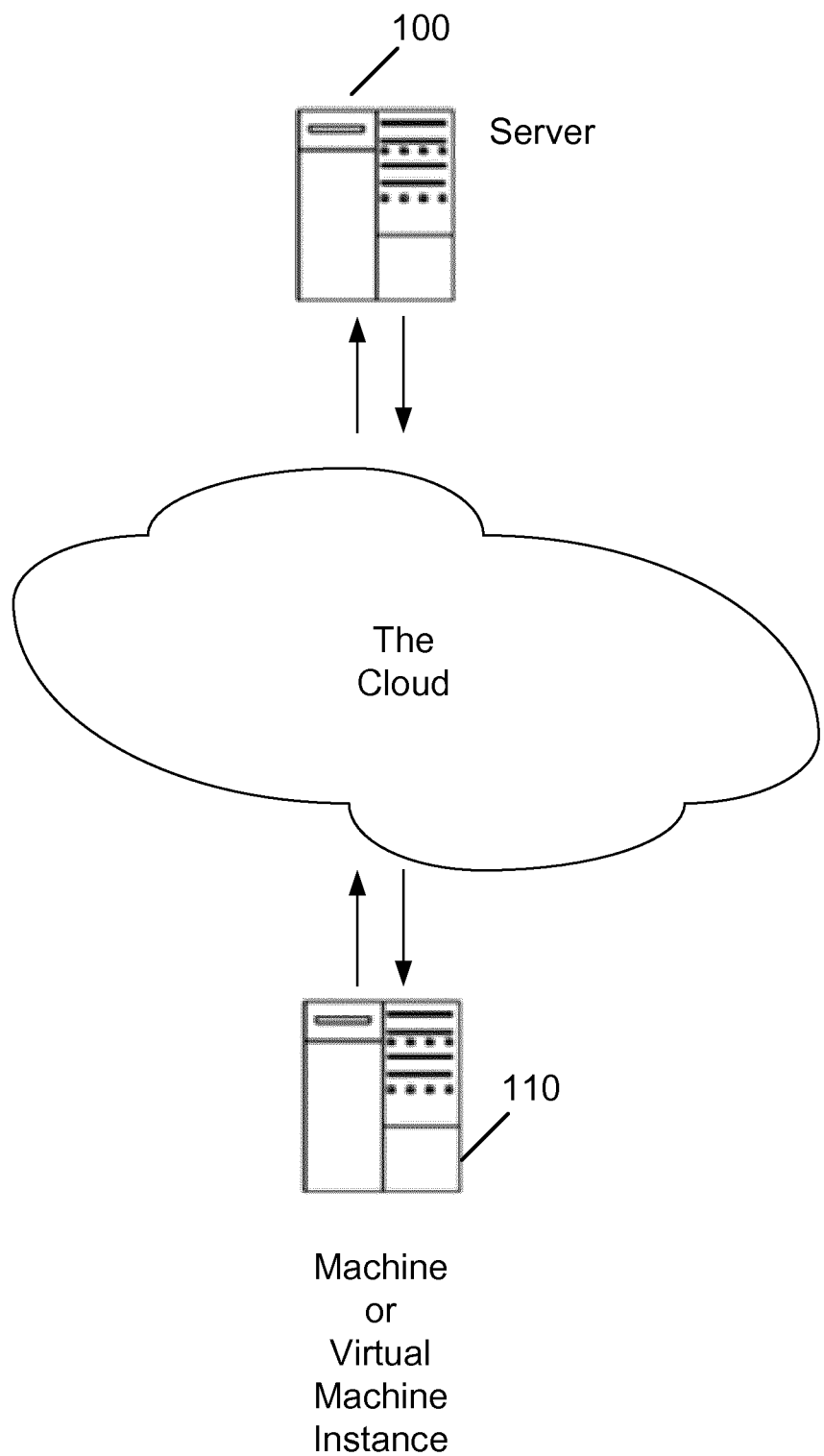
FIG. 1A is a block diagram of one embodiment of a cloud network setting, in which a machine or virtual machine instance and a server communicate.

Referring to FIG. 1A, a block diagram of one embodiment of a cloud network setting enabling communication between a machine or virtual machine instance and a server is shown. While depicted as distinct from, or outside of, the cloud, either or both of the server 100 and machine or virtual machine instance 110 may also be within the cloud itself. In brief overview, a machine 110 or virtual machine instance 110 may send requests or other communication through the cloud network to a server 100. The server 100 may be a virtual server manager 100 that may manage instantiation, configuration, and/or termination of virtual server instances such as machine 110 or virtual machine instance 110. The server 100 may monitor any data or requests received from the machine(s) 110 or virtual machine instance(s) 110. In some embodiments, the machine 110 or virtual machine instance 110 may communicate with the server 100 via a network protocol, which may be wrapped in an API.

Figure 1B:
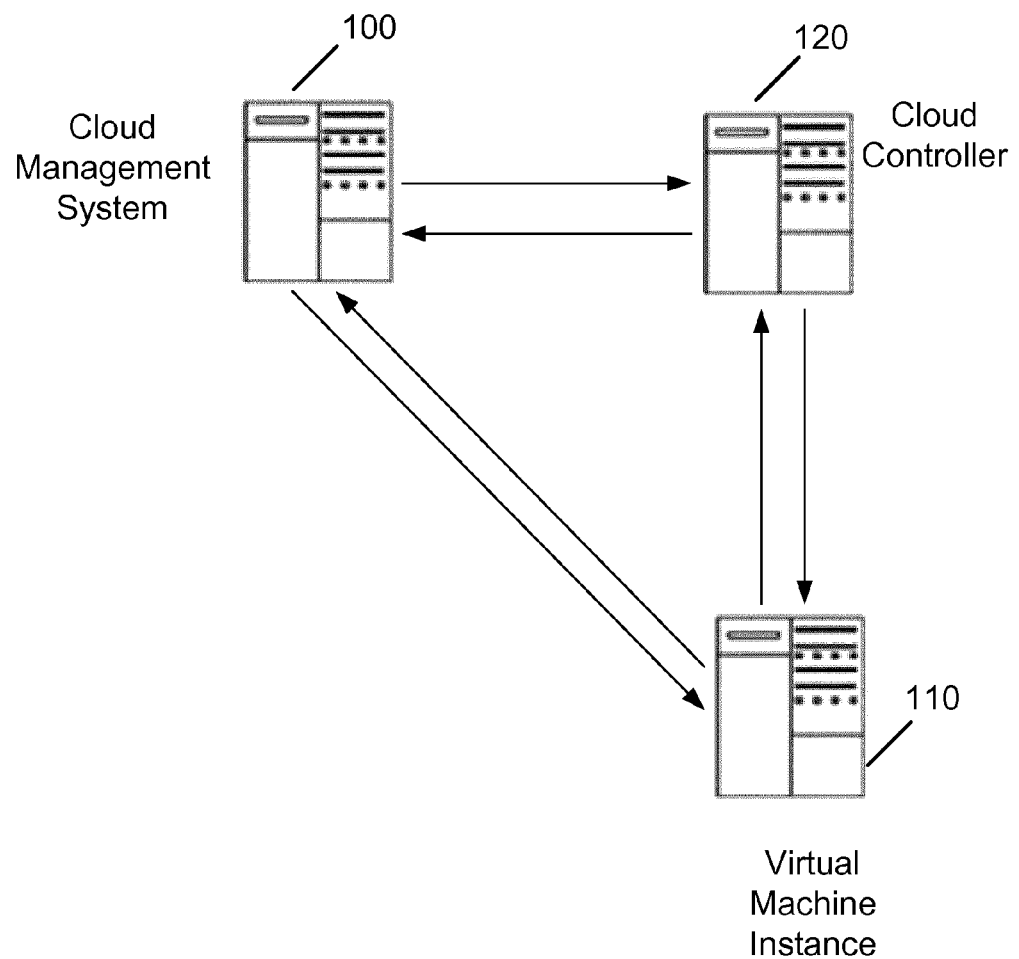
FIG. 1B is a block diagram of one embodiment of a cloud network setting, in which a cloud management system communicates with a cloud controller to launch virtual machine instance(s)

FIG. 1B is a block diagram depicting a further embodiment of the server 100 and machine or virtual machine instance 110 shown in FIG. 1A. In FIG. 1B, the server 100 may be a cloud management system 100. The cloud management system 100 may send a request to a cloud controller 120 to launch one or more virtual machine instances 110. In some embodiments, the cloud management system 100 may communicate with the cloud controller 120 via an API.

The cloud controller 120 may receive a launch request from a cloud management system 100, causing the cloud controller 120 to launch one or more virtual instances 110. The cloud controller 120 may forward a virtual machine instance identifier to the launched virtual machine instance 110. The identifier may be a certificate. The identifier may be a characteristic of the virtual machine instance encrypted by a trusted system. For example, the identifier may be a MAC address cryptographically signed by a trusted system. In some embodiments, the identifier includes a timestamp, e.g., a signing date or an expiration date. In some embodiments, the cloud controller 120 may communicate with the virtual machine instance 110 via an API.

The cloud controller 120 may comprise any computer device capable of launching virtual machine instances 110 or receiving requests to launch virtual machine instances 110, or the like. In some embodiments, the cloud controller 120 may comprise a single server; in other embodiments, cloud controller 120 may comprise a server cluster. In some embodiments, cloud controller 120 may have one or more associated databases for storing information.

Referring now to both FIGS. 1A and 1B, the server 100 or cloud controller 120 may manage virtual server(s), physical server(s), or both. The cloud network may or may not involve virtualization. For example, if virtualization is not involved, the machine 110 may boot into a "manager" operating system that makes the booted server available to the cloud network. When a machine image is to be launched on that server, the bootstrap operating system may install the image on local drive(s) and may reboot into the image. To terminate the server, the server may be remotely rebooted into the manager operating system.

Still referring to FIGS. 1A and 1B, now in greater detail, the server 100 may comprise any computer device capable of receiving requests to receive information, perform an action, or the like. In some embodiments, the server 100 may comprise a single server; in other embodiments, the server 100 may comprise a server cluster.

The server 100 may be a domain controller or other machine or virtual machine instance that responds to outside requests. That is, the server 100 may have authority to grant (or deny) requests for access from other machines or virtual machine instances. In some embodiments, the machine 110 or virtual machine instance 110 is not a domain controller and does not have authority to respond to outside requests. More specifically, in some embodiments, the machine 110 or virtual machine instance 110 does not have authority to grant requests for access from other machines or virtual machine instances.

In various embodiments, the computing environment may include more than one server 100 and/or more than one cloud controller 120. The servers 100 or cloud controllers 120 may be logically grouped into server farm(s). In some embodiments, a server farm may include servers 100 and/or cloud controllers 120 that are geographically dispersed and logically grouped in server farm(s), servers 100 or cloud controllers 120 that are located proximate to each other and logically grouped together in server farm(s), or several virtual servers 100 or virtual cloud controllers 120 executing on physical server(s). Geographically dispersed servers 100 or cloud controllers 120 within a server farm can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments, the server farm is administered as a single entity, while in other embodiments, the server farm includes multiple server farms.

A server 100, cloud controller 120, or machine 110 or virtual machine instance 110 may be connected in any manner, and via any network or networks. Connections and networks included in the connections may comprise the Internet, local networks, web servers, file servers, routers, databases, computers, servers, network appliances, or any other computing devices capable of sending and receiving information. A network may comprise computing devices connected via cables, infrared ports, wireless signals, or any other means of connecting multiple computing devices. A network and any devices connected to the networks may communicate via any communication protocol used to communicate among or within computing devices, including without limitation SSL, BitTorrent, HTML, XML, RDP, ICA, FTP, HTTP, SIP, XMPP (also known as Jabber), TCP, IP, UDP, IPX, SPX, NetBIOS, NetBEUI, SMB, SMTP, Ethernet, ARCNET, Fiber Distributed Data Interface (FDDI), RS232, IEEE 802.11, IEEE 802.11a, IEE 802.11b, IEEE 802.11g, IEEE 802.11n, WiMax and direct asynchronous connections, or any combination and/or extensions thereof. The network may comprise mobile telephone networks utilizing any protocol or protocols used to communicate among mobile devices, including AMPS, TDMA, CDMA, GSM, GPRS, or UMTS.

Figure 2A:
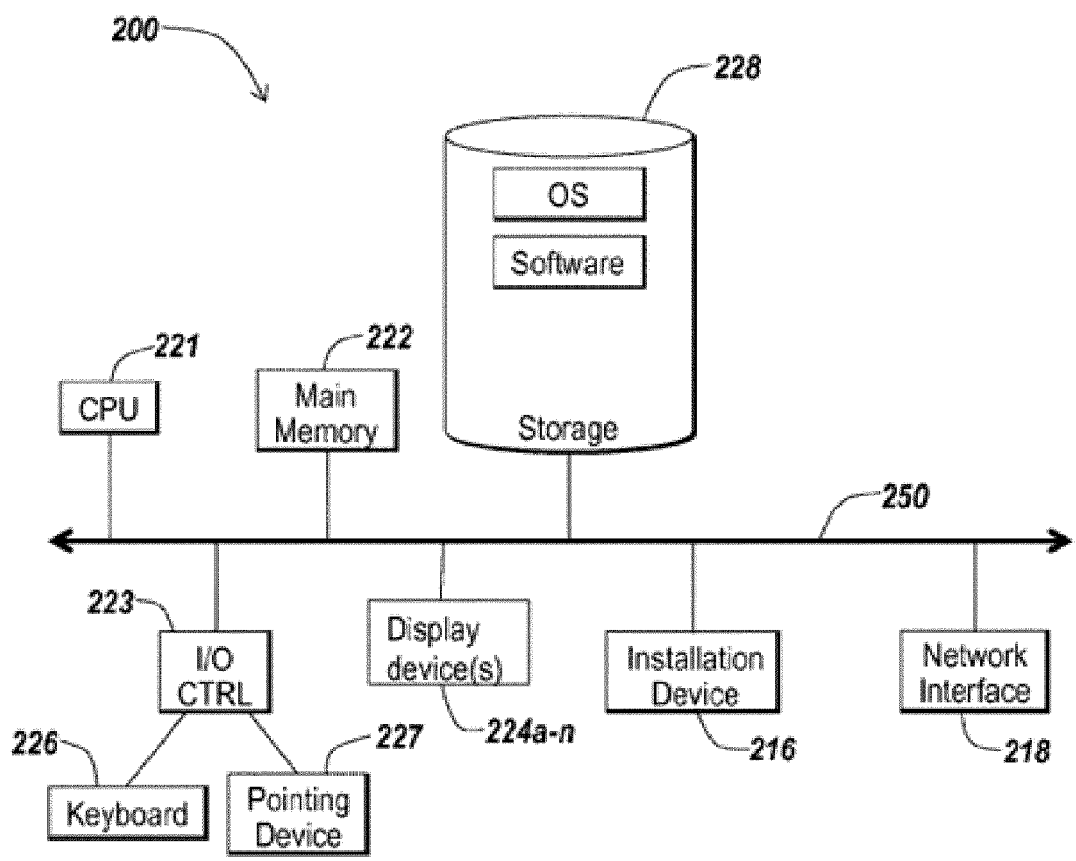
FIGS. 2A and 2B are block diagrams of a typical computer 200 useful as client computing devices and server computing devices, according to one embodiment.
Figure 2B:
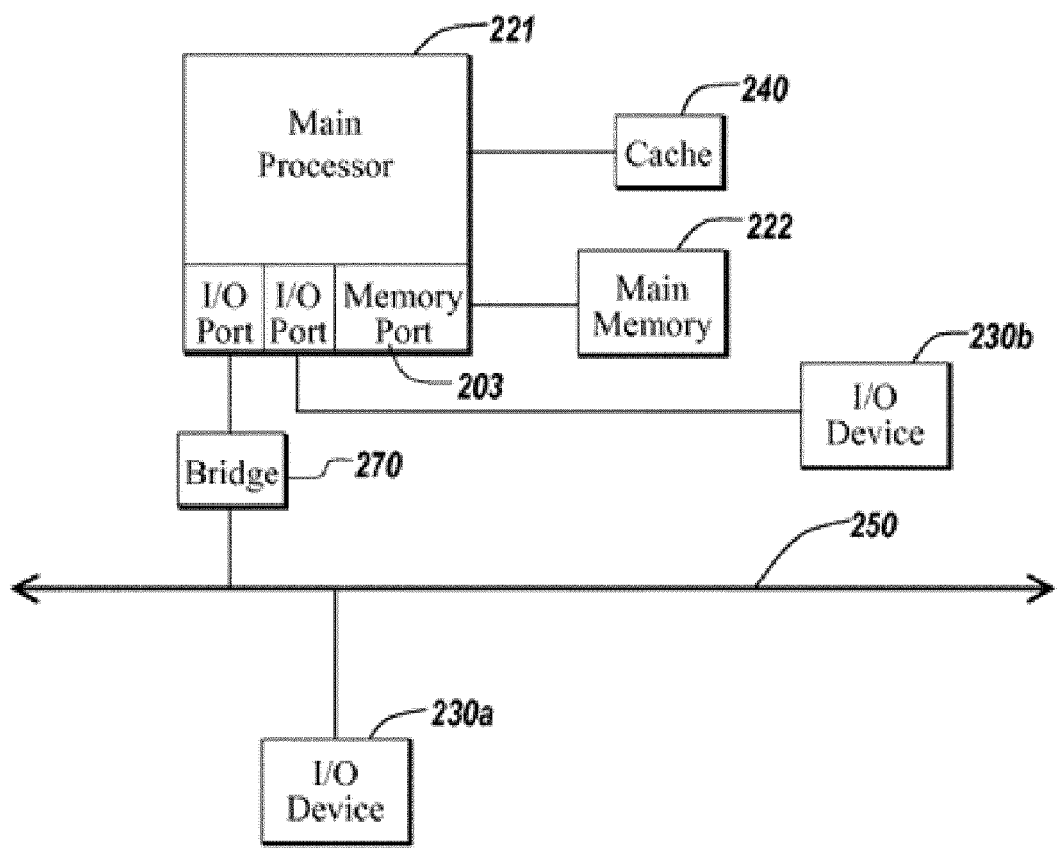

FIGS. 2A and 2B depict block diagrams of a computing device 200 useful for practicing an embodiment of a server 100, a cloud controller 120, a machine 110, or a host of a virtual machine instance 110. A server 100, a cloud controller 120, a machine 110, or virtual machine instance 110 may be, may be deployed as, and/or may be executed on any type and form of computing device, such as a computer, network device, or appliance capable of communicating on any type and form of network and performing the operations described herein.

In some embodiments, the server 100 or cloud controller 120 may itself be a virtual machine. The server 100, cloud controller 120, or virtual machine instance 110 may be managed by a hypervisor developed by XenSolutions, Citrix Systems, IBM, VMware, or any other hypervisor.

As shown in FIGS. 2A and 2B, each computing device 200 includes a central processing unit 221 (or "processor"), and a main memory unit 222. As shown in FIG. 2A, a computing device 200 may include a visual display device 224, a keyboard 226, and/or a pointing device 227, such as a mouse. As shown in FIG. 2B, each computing device 200 may also include additional optional elements, such as one or more input/output devices 230a-230b (generally referred to using reference numeral 230), and a cache memory 240 in communication with the central processing unit 221.

The central processing unit 221 may be any logic circuitry that responds to and processes instructions fetched from the main memory unit 222. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 200 may be based on any of these processors, or any other processor capable of operating as described herein.

While FIG. 2A illustrates a computing device 200 that includes a single central processing unit 221, in some embodiments, the computing device 200 may include one or more processing units 221. The computing device 200 may store and execute firmware or other executable instructions that, when executed, direct the one or more processing units 221 to simultaneously execute instructions or to simultaneously execute instructions on a single piece of data. The computing device 200 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 221 may include one or more processing cores. For example, the processing unit 221 may have two cores, four cores, eight cores, or any number of cores. The processing unit 221 may comprise one or more parallel processing cores. The processing cores of the processing unit 221 may access available memory as a global address space, or in other embodiments, memory within the computing device 200 is segmented and assigned to a particular core within the processing unit 221. The one or more processing cores or processors in the computing device 200 may each access local memory. In still other embodiments, memory within the computing device 200 may be shared amongst one or more processors or processing cores, while other memory may be accessed by particular processors or subsets of processors. In embodiments where the computing device 200 includes more than one processing unit, the multiple processing units may be included in a single integrated circuit (IC). These multiple processors may be linked together by an internal high speed bus, which may be referred to as an element interconnect bus.

Main memory unit 222 may be one or more memory chips capable of storing data and allowing any storage location to be directly accessed by the microprocessor 221, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC200 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 222 may be based on any of the above described memory chips, or any other available memory chips capable of operating as described herein. In the embodiment shown in FIG. 2A, the processor 221 communicates with main memory 222 via a system bus 250 (described in more detail below). FIG. 2B depicts an embodiment of a computing device 200 in which the processor communicates directly with main memory 222 via a memory port 203. For example, in FIG. 2B the main memory 222 may be DRDRAM. In some embodiments, main memory 222 may be a network-attached storage device, external to the computing device 200.

FIG. 2B depicts an embodiment in which the main processor 221 communicates directly with cache memory 240 via a secondary bus, sometimes referred to as a backside bus. In other embodiments, the main processor 221 communicates with cache memory 240 using the system bus 250. Cache memory 240 typically has a faster response time than main memory 222 and is typically provided by SRAM, BSRAM, or EDRAM. In the embodiment shown in FIG. 2B, the processor 221 communicates with various I/O devices 230 via a local system bus 250. Various buses may be used to connect the central processing unit 221 to any of the I/O devices 230, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 224, the processor 221 may use an Advanced Graphics Port (AGP) to communicate with the display 224. FIG. 2B depicts an embodiment of a computer 200 in which the main processor 221 communicates directly with I/O device 230b via HyperTransport, Rapid I/O, or InfiniBand. FIG. 2B also depicts an embodiment in which local busses and direct communication are mixed: the processor 221 communicates with I/O device 230a using a local interconnect bus while communicating with I/O device 230b directly.

The computing device 200 may support any suitable installation device 216, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive, a network-attached storage device, or any other device suitable for installing software and programs or portions thereof. The computing device 200 may further comprise a storage device, such as one or more hard disk drives or redundant arrays of independent disks, Flash memory, or EEPROMs, for storing an operating system and other related software, and for storing application software programs. Optionally, any of the installation devices 216 could also be used as the storage device. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 200 may include a network interface 218 to interface to a Local Area Network (LAN), Wide Area Network (WAN) or the Internet through a variety of connections including, but not limited to, standard telephone lines, LAN or WAN links (e.g., 802.11, T1, T3, 56KB, X.25, SNA, DECNET), broadband connections (e.g., ISDN, Frame Relay, ATM, Gigabit Ethernet, Ethernet over-SONET, ADSL, SDSL), wireless connections, or some combination of any or all of the above. Connections can be established using a variety of communication protocols. In one embodiment, the computing device 200 communicates with other computing devices 200 via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 218 may comprise a built-in network adapter, network interface card, PCMCIA network card, card bus network adapter, wireless network adapter, USB network adapter, modem or any other device suitable for interfacing the computing device 200 to any type of network capable of communication and performing the operations described herein.

A wide variety of I/O devices 230a-230n may be present in the computing device 200. Input devices include keyboards, touch screens, mice, trackpads, trackballs, microphones, and drawing tablets. Output devices include video displays, touch screens, speakers, inkjet printers, dot matrix printers, laser printers, and dye-sublimation printers. The I/O devices may be controlled by an I/O controller 223 as shown in FIG. 2A. The I/O controller may control one or more I/O devices such as a keyboard 226 and a pointing device 227, e.g., a mouse or optical pen. Furthermore, an I/O device may also provide storage and/or an installation medium 216 for the computing device 200. In still other embodiments, the computing device 200 may provide USB connections to receive handheld USB storage devices such as the USB Flash Drive line of devices manufactured by Twintech Industry, Inc. of Los Alamitos, Calif.

In some embodiments, the computing device 200 may comprise or be connected to multiple display devices 224a-224n, which each may be of the same or different type and/or form. As such, any of the I/O devices 230a-230n and/or the I/O controller 223 may comprise any type and/or form of suitable hardware, software, or combination of hardware and software to support, enable or provide for the connection and use of multiple display devices 224a-224n by the computing device 200. For example, the computing device 200 may include any type and/or form of video adapter, video card, driver, and/or library to interface, communicate, connect or otherwise use the display devices 224a-224n. In one embodiment, a video adapter may comprise multiple connectors to interface to multiple display devices 224a-224n. In other embodiments, the computing device 200 may include multiple video adapters, with each video adapter connected to one or more of the display devices 224a-224n. In some embodiments, any portion of the operating system of the computing device 200 may be configured for using multiple displays 224a-224n. In other embodiments, one or more of the display devices 224a-224n may be provided by one or more other computing devices, such as computing devices 200a and 200b connected to the computing device 200, for example, via a network. These embodiments may include any type of software designed and constructed to use another computer's display device as a second display device 224a for the computing device 200. One ordinarily skilled in the art will recognize and appreciate the various ways and embodiments that a computing device 200 may be configured to have multiple display devices 224a-224n.

In further embodiments, an I/O device 230 may be a bridge between the system bus 250 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

A computing device 200 of the sort depicted in FIGS. 2A and 2B typically operates under the control of operating systems, which control scheduling of tasks and access to system resources. The computing device 200 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS VISTA, and WINDOWS 7, all of which are manufactured by Microsoft Corporation of Redmond, Wash.; MAC OS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 200 may be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computer system 200 may comprise a device of the IPOD family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

Figure 3:
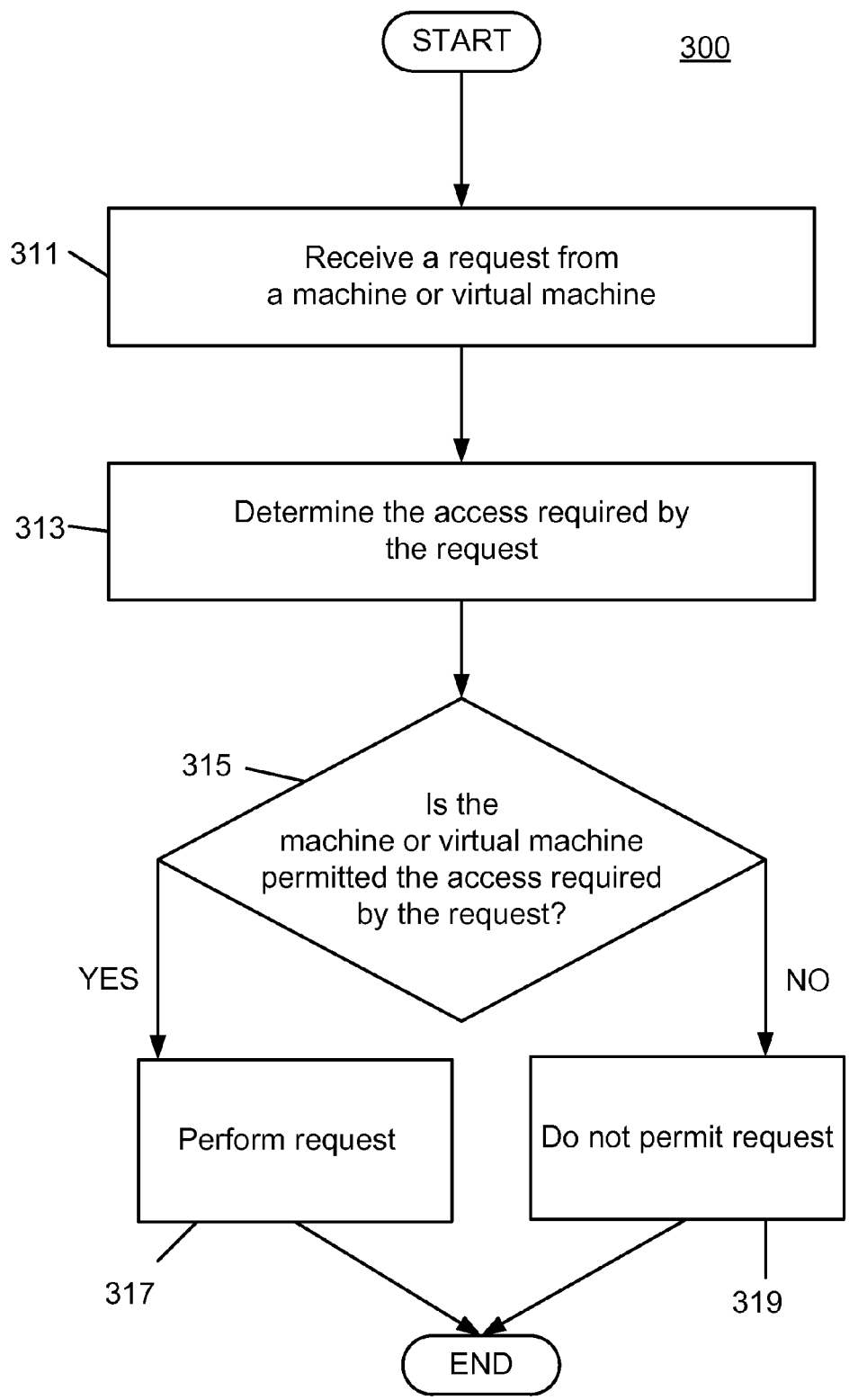
FIG. 3 is a flow diagram, according to one embodiment, illustrating a method for associating a machine or virtual machine with an access control right.

Referring now to FIG. 3, a flow diagram illustrating a method 300 for associating a machine 110 or virtual machine instance 110 with an access control right in a cloud-based computing environment, according to an embodiment, is shown.

In step 311, a request is received by a server 100 from a machine 110 or virtual machine instance 110 or on behalf of a machine 110 or virtual machine instance 110. According to some embodiments, the request may be received through API call(s). For example, there may be API call(s) to server(s) 100 in the cloud over one or more channels, such as a hypertext transfer protocol secure (HTTPS) API or a cloud communication network. The API call(s) may be made by a script or other software from machine 110 or virtual machine instance 110. The request may be an authentication request. The request may be a request to perform a configuration task.

The request may be accompanied by an identifier, e.g., a virtual machine instance identifier. The identifier may be a certificate. The identifier may be a characteristic of the virtual machine instance encrypted by a trusted system. For example, the identifier may be a MAC address cryptographically signed by a trusted system. In some embodiments, the identifier includes a timestamp, e.g., a signing date or an expiration date. In some embodiments, the identifier includes multiple identification elements. Identification elements may be verifiable. The identity of the requestor may be authenticated via the identifier. A request accompanied by a valid identifier is an authenticated request. The identifier may be included in or associated with the received request.

These API call(s) may require authentication of the requester or requesting machine 110 or virtual machine instance 110. If so, in step 313, a server 100 determines what level or type of access is required in order to grant the received request. For example, level or type of access may include a level or type that specifies whether the requester 110 must be permitted to change the cloud configuration, change the configuration of one or more servers, create a backup of virtual machine image(s), hard disk(s), or file(s), allow one or more servers to take over for one or more other servers, allow one or more servers to act as load-balancing servers, allow one or more servers to cease accepting traffic, change the manner in which one or more servers accept traffic, attach or block storage devices or other storage devices to or from a virtual machine, attach or detach IP addresses or other forms of network addresses to or from a virtual machine, change something or anything regarding cloud or server administration, or the like.

In step 315, a server 100 may determine whether the machine 110 or virtual machine instance 110 has the level or type of access determined to be required in step 313. If the machine 110 or virtual machine instance 110 does have the required access level, then step 317 is executed. If the machine 110 or virtual machine instance 110 does not have the required access level, then step 319 is executed.

In various embodiments, step 315 is based on whether the machine 110 or virtual machine instance 110 itself is allowed access. That is, access is granted or denied on a machine (or virtual machine instance)-by-machine (or virtual machine instance) basis, on a group basis (a group of machine(s) and/or virtual machine instance(s)), or on a basis that is a combination of those or other bases. In various embodiments, access is not granted or denied based on a user-by-user basis or a group basis (if that group includes only user(s) or groups of user(s)). In some embodiments, access is allowed based on both a machine/virtual-machine-instance basis and one or more other basis, such as a user-by-user basis.

Determining whether the machine 110 or virtual machine instance 110 is required to be given access may require determining the identity of the requesting machine 110 or virtual machine instance 110 or the identity of the group of machine(s) and/or virtual machine(s) to which the requesting machine 110 or virtual machine instance 110 belongs. In various embodiments, one or more identifiers may be used to determine this identity. Each identifier may be a unique identifier, non-unique identifier, globally unique identifier, a cryptographic token or key, or the like.

In some embodiments, the identifier(s) is determined by combining other identifiers. For example, each server may have a unique identifier. One or more machines 110 or virtual machine instances 110 may be associated with a server. The machine(s) 110 or virtual machine instance(s) 110 may have identifier(s) unique to the server. Identifiers may be determined, for example, by incrementing the number of the previous identifier for the server. Thus, a machine 110 or virtual machine instance 110 identifier unique to the system may be created by combining the server identifier with the machine or virtual machine identifier.

The identifier(s) may be created by a server 100 at or around the time the virtual machine instance 110 is launched in the cloud. The identifier(s) may be created during the call to the virtual machine launch API of the cloud, and then returned as a return value of the API call. An API may assign the identifier(s) to the virtual machine instance 110 or a group of virtual machines or an API may retrieve an already-generated identifier(s) and pass it or return it to the virtual machine instance 110 or a proxy. Assigning an identifier may include associating an identifier with machine(s) or virtual machine instance(s) that currently exist, may exist in the future, or are in the process of being launched. In some embodiments, the identifier is cryptographically signed, e.g., by a trusted signing service.

Alternatively, the identifier(s) may be created or retrieved after the virtual machine has been launched. When the virtual machine instance boots, it may retrieve or locate the identifier(s) that was saved within the instance or available as a callback or API call. As another option, the server 100 may send the identifier directly to the virtual machine instance 110. For example, the virtual machine instance 110 may send a form of identification to the server 100, and based, on that identification, the server 100 may return the corresponding identifier.

In step 317, a server 100 grants the machine 110 or virtual machine instance 110 the access required by the received request. The access may be granted in full, partially granted and partially denied, or modified and granted in part or in full as modified. For example, a scope of allowed access associated with the machine or virtual machine instance based on the access control right may be determined and the request may be performed using the determined scope. Performing a request using a scope may include allowing the request, denying the request, partially allowing the request and partially denying the request, or modifying the request.

In step 319, a server 100 denies the machine 110 or virtual machine instance 110 the access required by the received request. The access may be modified and denied as modified.

Figure 4:
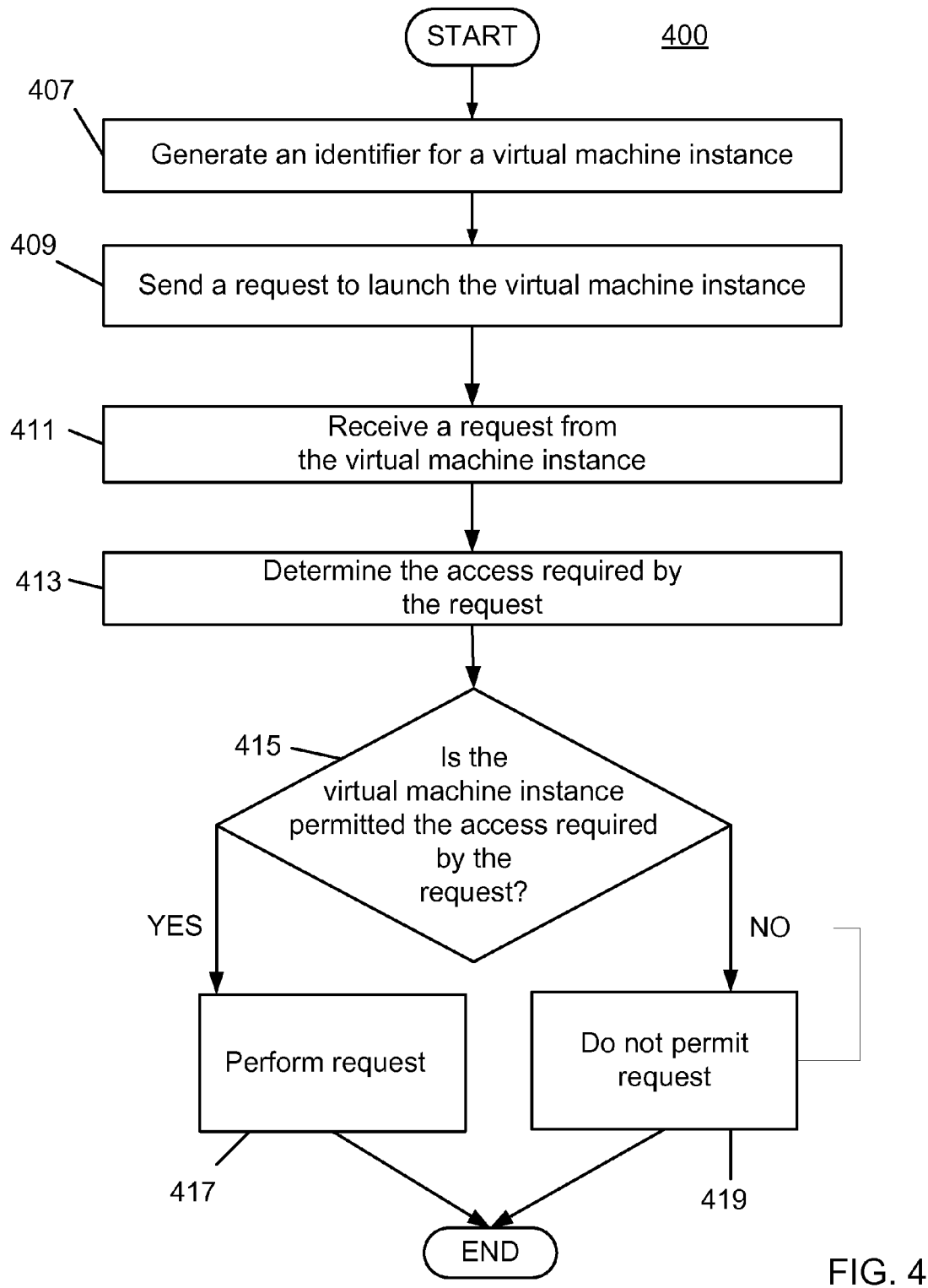
FIG. 4 is a flow diagram, according to one embodiment, illustrating a method for launching a virtual machine and associating it with an access control right.

Another example is shown in FIG. 4, a flow diagram illustrating a method 400 for associating a virtual machine instance 110 with an access control right in a cloud-based computing environment, according to an embodiment, is shown. Steps 411 through 419 of method 400 correspond with steps 311 through 319 of method 300, discussed herein.

In step 407 of method 400, a server 100 may assign an identifier to a virtual machine instance 110.

In step 409, a server 100 may be a cloud management system that may send a request to a cloud controller 120 to launch a virtual machine instance. The launch request may include the identifier assigned to the virtual machine instance 110. In some alternative embodiments, no launch request is sent, and instead, the server 100 launches the virtual machine instance 110 itself.

The cloud controller 120 may receive a launch request from a cloud management system 100, causing the cloud controller 120 to launch one or more virtual machine instances 110. The cloud controller 120 may forward the identifier to the launched virtual machine instance 110. The forwarded identifier may be the same as the one received by the cloud controller 120 in the launch request from the cloud management system 100. The identifier may be included in or associated with the received request.

There are several possible mechanisms for passing the identifier(s) from a server 100 or cloud controller 120 to the machine 110 or virtual machine instance 110. There may be a network-accessible service on a canonical, non-routable IP address that is queried by the machine 110 or virtual machine instance 110. This service may distinguish the machine 110 or virtual machine instance 110 from others by source IP or MAC address and return the appropriate identifier(s). Alternatively, this service may be hosted on the same host server as the virtual machine and may identify the virtual machine's request through a hypervisor. As another example, a hypervisor may modify the file system of the virtual machine instance 110 before starting the instance 110 and place the identifier(s) in a file at a location specified in the launch API call. In yet another example, the identifier(s) may be encapsulated in a file system image, such as a tiny FAT or CDROM (such as a iso9660 CDROM) file system, and may be provided by a hypervisor to the virtual machine instance 110 as a mountable disk drive. Another option may be to use a special hypervisor-guest communication channel for transferring the identifier(s).

At, before, after, or near the time of the received request, the identifier(s) may be received by a server 100 from the machine 110 or virtual machine instance 110 or a proxy. The identifier(s) may be passed as a parameter to an API, along with the received request, or separately from the received request. The identifier(s) may be associated with the received request in some manner, such as mapped to each other directly or indirectly in a lookup table, included with the received request, or the like. The identifier(s) may be returned by one or more callbacks, a reference to which is passed along with the received request or another API call(s).

The identifier(s) may be used by a server 100 to determine whether the machine 110 or virtual machine instance 110 is permitted access. The identifier(s) may be mapped to the permissions or allowed actions, and that may be compared to the permission(s) necessary for the action(s) or inaction(s) requested in the received request. The mapping may include consulting a list (such as an ACL) or table of permitted identifiers, permissions, machines, virtual machines, or groups of machine(s) and/or virtual machine instance(s), or the like. The mapping may include determining a scope of allowed access for a machine, virtual machine instance, group of machine(s) and/or virtual machine instance(s), or identifier(s). Based on this mapping or scope of allowed access, it may be determined whether the access is required to be granted or not, partially granted and partially denied or not, modified or not, or modified and granted, modified and partially granted and partially denied, or modified and denied.

The scope of allowed access may be dependent on an account or a role. The scope of allowed access may be limited to a subset of servers or resources, limited in one manner but not another, or not limited. For example, a deployment of cooperating servers may be a replicate database system in which a cluster of servers may provide a unified service to client servers that send them requests. The servers in the cluster may be granted no permissions, limited permissions, or full permissions to act on a subset or all other servers in the cluster and/or on a subset or all resources attached to them. But, they may be denied access to other servers or resources in the same account or a different account in the cloud computing environment. Another example is a single or set of special management servers that may be used in an account to monitor and manage some or all other servers in a deployment. For instance, such servers may be used to push software updates or to push user login credential changes to many or all other servers. Such management servers may be granted special permissions to act on these other servers. Another example is a multi-tier application deployment with multiple servers in each tier. In such a deployment, new servers in a tier may need to register with or access other servers in the tier. This may be facilitated by granting servers in the tiers permissions to access information and perform limited actions on the other servers in the tier. In yet another example, a permission may include permission to obtain addressing identification for other servers by tag (for instance, a "load balancer" tag). In still another example, a permission may include permission to send requests to the other servers (for instance, to register with a load balancer).

According to some embodiments, modifying the access may include a server 100 placing a limitation on the requested access or action. For example, the limitation may involve a time frame. That is, if a set of backup files or images is requested, the modified access may be limited to include those backup files or images created within a specified time frame, such as those that are older than one year. As another example, the limitation may be related to a state, type, or the like. For instance, if a list of running servers is requested, the modified access may include a list of running servers that were deployed in the same deployment or in the same account as the requesting virtual machine instance 110.

According to some embodiments, a user or software on a server 100 may configure access rights. Access rights may be preconfigured or configured during runtime of a server 100 determining whether the machine 110 or virtual machine instance 110 has access.

In step 417, a server 100 grants the machine 110 or virtual machine instance 110 the access required by the received request. The access may be granted in full, partially granted and partially denied, or modified and granted in part or in full as modified. For example, a scope of allowed access associated with the machine or virtual machine instance based on the access control right may be determined and the request may be performed using the determined scope. Performing a request using a scope may include allowing the request, denying the request, partially allowing the request and partially denying the request, or modifying the request.

In step 419, a server 100 denies the machine 110 or virtual machine instance 110 the access required by the received request. The access may be modified and denied as modified.

In some embodiments, a server 100 returns a "ticket" in response to the received request, e.g., where the request is an authentication request. The ticket may be used to identify a granted permission. The ticket may be an identifier, key, or the like that represents a granted permission or an authentication. This ticket may then be used by the machine or virtual machine instance 110 or a proxy for the machine or virtual machine instance 110 to obtain access, be allowed to perform an action, or the like. That is, the ticket may be presented to another server to demonstrate that the caller has been granted a permission or authenticated by the ticket-granting server 100.

While the invention has been particularly shown and described with reference to specific preferred embodiments, it should be understood by those skilled in the art that various changes in form and detail may be made therein without departing from the spirit and scope of the invention as defined by the appended claims.

According to various embodiments of the invention, methods 300 and 400 may each be implemented through computer software running on a computing device. According to other embodiments, methods 300 and 400 may each be implemented in computer hardware or circuitry. Methods 300 and 400 may each be implemented through a combination of software and hardware or circuitry.

Having described certain embodiments of an apparatus for interacting with software, it will now become apparent to one of skill in the art that other embodiments incorporating the concepts of the disclosure may be used.

What is claimed is:

1. A method for associating a virtual machine instance with an access control right in a cloud-based computing environment, the method comprising:
    receiving, by a management server from a virtual machine instance executing in a cloud-based computing environment provided by a third-party cloud infrastructure service, a request to perform an action or to be granted access;
    using, by the management server, an identifier to determine that the received request was sent by, or on behalf of, the virtual machine instance;
    identifying, by the management server, an access control right associated with the virtual machine instance making the request, to determine whether or not to perform the action on behalf of, or grant access to, the requesting virtual machine instance;
    determining, by the management server, a scope associated with the virtual machine instance based on the access control right; and
    transmitting, by the management server to the third-party cloud infrastructure service, authorization to perform the action or grant the access using the determined scope.

2. The method of claim 1, wherein the identifier is included in or associated with the received request.

3. The method of claim 1, wherein authorization to perform the request using the determined scope comprises one of allowing the request, denying the request, partially allowing the request and partially denying the request, and modifying the request.

4. The method of claim 1, further comprising:
    assigning the identifier to the virtual machine instance; and
    sending the identifier to the virtual machine instance.

5. The method of claim 2, further comprising:
    assigning the identifier to the virtual machine instance; and
    sending the identifier in a request to launch the virtual machine instance.

6. The method of claim 5, wherein the identifier is unique to the virtual machine instance.

7. The method of claim 1, wherein the identifier is associated with a group of one or more virtual machine instances of which the virtual machine instance is a member.

8. The method of claim 1, wherein the request is an authentication request, the method further comprising:
    returning a ticket in response to the authentication request.

9. An apparatus for associating a virtual machine instance with an access control right in a cloud-based computing environment, the apparatus comprising:
    a cloud management service executing on a processor, the cloud management service configured to:
        receive, from a virtual machine instance executing in a cloud-based computing environment provided by a third-party cloud infrastructure service, a request to perform an action or to be granted access;
        use an identifier to determine that the received request was sent by, or on behalf of, the virtual machine instance;
        identify an access control right associated with the virtual machine instance making the request, to determine whether or not to perform the action on behalf of, or grant access to, the requesting virtual machine instance;

determine a scope associated with the virtual machine instance based on the access control right; and transmit, to the third-party cloud infrastructure service, authorization to perform the action or grant the access using the determined scope.

10. The apparatus of claim 9, wherein the identifier is included in or associated with the received request.

11. The apparatus of claim 9, wherein authorization to perform the request using the determined scope comprises one of allowing the request, denying the request, partially allowing the request and partially denying the request, and modifying the request.

12. The apparatus of claim 9, the cloud management service:
assigning the identifier to the virtual machine instance; and
sending the identifier to the virtual machine instance.

13. The apparatus of claim 10, the cloud management service:
assigning the identifier to the virtual machine instance; and
sending the identifier in a request to launch the virtual machine instance.

14. The apparatus of claim 13, wherein the identifier is unique to the virtual machine instance.

15. The apparatus of claim 9, wherein the identifier is associated with a group of one or more virtual machine instances of which the virtual machine instance is a member.

16. The apparatus of claim 9, wherein the request is an authentication request, the cloud management service returning a ticket in response to the authentication request.

17. A method for associating a virtual machine instance with an access control right in a cloud-based computing environment, the method comprising:

receiving, by a management server, a first request for a first virtual machine instance executing in a first cloud-based computing environment provided by a first third-party cloud infrastructure service to perform an action or to be granted access;

using, by the management server, a first identifier to determine that the received first request was sent by, or on behalf of, the first virtual machine instance;

identifying, by the management server, a first access control right associated with the first virtual machine instance making the first request, to determine whether or not to perform the first request;

receiving, by the management server, a second request for a second virtual machine instance executing in a second cloud-based computing environment provided by a second third-party cloud infrastructure service to perform an action or to be granted access;

using, by the management server, a second identifier to determine that the received second request was sent by, or on behalf of, the second virtual machine instance, wherein the second identifier is different from the first identifier; and identifying, by the management server, a second access control right associated with the second virtual machine instance making the second request, to determine whether or not to perform the second request.

18. The method of claim 17, further comprising:
determining, by the management server, a scope associated with the first virtual machine instance, based on the first access control right; and
transmitting, by the management server to the first third-party cloud infrastructure service, authorization to perform the first request using the determined scope.

19. The method of claim 17, further comprising:
determining, by the management server, a scope associated with the second virtual machine instance based on the second access control right; and
transmitting, by the management server to the second third-party cloud infrastructure service, authorization to perform the second request using the determined scope.

20. The method of claim 17, wherein the first identifier is included in or associated with the received first request and the second identifier is included in or associated with the received second request.

* * * * *